United States Patent
Rorai et al.

(10) Patent No.: US 8,498,199 B2
(45) Date of Patent: Jul. 30, 2013

(54) MAINTAINING TIME-DIVISION MULTIPLEXING OVER PSEUDOWIRE CONNECTIONS DURING NETWORK OUTAGES

(75) Inventors: Joseph Rorai, Kanata (CA); Claude Parent, Gatineau (CA)

(73) Assignee: Alcatel Lucent, Paris (FR)

( * ) Notice: Subject to any disclaimer, the term of this patent is extended or adjusted under 35 U.S.C. 154(b) by 707 days.

(21) Appl. No.: 12/485,623

(22) Filed: Jun. 16, 2009

(65) Prior Publication Data
US 2010/0315941 A1  Dec. 16, 2010

(51) Int. Cl.
G01R 31/08  (2006.01)
H04L 12/28  (2006.01)

(52) U.S. Cl.
USPC ......... 370/216; 370/242; 370/395.5; 370/412

(58) Field of Classification Search
USPC .................................. 370/216–229
See application file for complete search history.

(56) References Cited

U.S. PATENT DOCUMENTS

| | | | | |
|---|---|---|---|---|
| 5,956,324 A | * | 9/1999 | Engdahl et al. | 370/242 |
| 6,539,023 B1 | * | 3/2003 | Bartholomay et al. | 370/412 |
| 7,245,630 B1 | * | 7/2007 | Chen et al. | 370/458 |
| 2004/0042425 A1 | * | 3/2004 | Parnes | 370/328 |
| 2004/0131088 A1 | * | 7/2004 | Moore et al. | 370/523 |
| 2007/0025361 A1 | * | 2/2007 | Lin et al. | 370/399 |

OTHER PUBLICATIONS

Vainshtein, A. et al. "Structure-Agnostic Time Division Multiplexing over Packet" Standard Track, Network Working Group, Request for Comments 4553, Jun. 2006, pp. 1-24.

* cited by examiner

*Primary Examiner* — Brandon Renner
(74) *Attorney, Agent, or Firm* — Kramer & Amado, PC (57) ABSTRACT

Various exemplary embodiments relate to a provider edge node and a related method. The provider edge node may include a receiver that receives at least one packet transmitted over a TDM pseudowire using a structure-agnostic transmission mechanism. The provider edge node may also include a physical interface configured to output frames to a corresponding customer edge (CE) device and a machine-readable storage medium that stores a TDM framing type corresponding to the physical interface. Finally, the provider edge node may include a circuit emulation engine that, during periods in which a network error has occurred, transmits a plurality of frames to the CE device over the physical interface. A TDM data payload of each frame may include an idle pattern, while a group of framing bits of the plurality of frames may define a framing pattern corresponding to the TDM framing type stored for the physical interface.

20 Claims, 4 Drawing Sheets

| Physical Interface | Framing Type |
|---|---|
| 001 | T1-SF |
| 002 | T1-ESF |
| 003 | M13 Asynchronous |

MAINTAINING TIME-DIVISION MULTIPLEXING OVER PSEUDOWIRE CONNECTIONS DURING NETWORK OUTAGES

TECHNICAL FIELD

Embodiments disclosed herein relate generally to emulation of time-division multiplexing in a packet-switched network and, more particularly, but not exclusively, to maintaining connectivity with a customer edge device during network outages.

BACKGROUND

In many legacy telecommunications networks, nodes in the network communicate using time-division multiplexing (TDM). TDM combines multiple data streams into one signal, thereby allowing the data streams to share physical lines in the data path without interfering with one another. More specifically, as its name suggests, TDM divides the signal into a number of segments, each constituting a fixed length of time. Because the sending node assigns data to the segments in a rotating, repeating sequence, the receiving node may reliably separate the data streams at the other end of the transmission medium.

With the rapid development of modern packet-switched networks, however, TDM has gradually fallen out of favor as a preferred technology. For example, Voice-Over-Internet Protocol (VoIP) services have replaced many TDM-based services, given VoIP's flexibility, ease of implementation, and reduction in costs. Unfortunately, transitioning to IP-based services requires a service provider to incur significant expenses in expanding its infrastructure and replacing customer premise equipment.

Given the large initial investment, many service providers have been reluctant to switch from TDM-based services to corresponding services in packet-switched networks. TDM pseudowires allow service providers to gradually transition to packet-switched networks, eliminating the need to replace TDM-based equipment and drop support of legacy services. In particular, on the ingress end of a TDM pseudowire, a node converts the TDM signals into a number of packets, then sends the packets across a packet-based path, or pseudowire. Upon receipt of the packets, a node on the egress end converts the packets back into TDM signals and forwards the TDM signals towards their ultimate destination.

As with any network service, service providers invest significant amounts of time and money in maintaining reliable connections for TDM pseudowire services. In the event of outages, service providers strive to restore connectivity to the customer as quickly as possible.

Unfortunately, fast restoration of service is often difficult in TDM pseudowires implemented according to Request for Comments (RFC) 4553, "Structure-Agnostic Time Division Multiplexing over Packet (SAToP)," published by the Internet Engineering Task Force and incorporated by reference herein in its entirety. During network delay and loss scenarios, a provider edge node notifies the connected customer edge (CE) device. When the provider edge node operates in accordance with RFC 4553, this notification causes the CE device to determine that the particular port is down. As a result, upon restoration of service, the CE device must first restore Layer 1 connectivity on the port, then restore Layer 2 connectivity, and so on. This process is time consuming, often taking many seconds to properly restore service to the CE device. In the interim, the customer is unable to exchange data between the two TDM endpoints.

In view of the foregoing, it would be desirable to more reliably manage TDM over pseudowire connections during network outages. More specifically, it would be desirable to decrease outage times during packet loss and delay situations in TDM pseudowires implemented according to a structure-agnostic transmission mechanism, such as SAToP. Other desirable aspects will be apparent to those of skill in the art upon reading and understanding the present specification.

SUMMARY

In light of the present need for maintaining TDM over pseudowire connections during network outages, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a provider edge node and a related method performed on the provider edge node. The provider edge node may include a receiver that receives at least one packet transmitted over a TDM pseudowire using a structure-agnostic transmission mechanism. The provider edge node may also include a physical interface configured to output frames to a corresponding customer edge (CE) device and a machine-readable storage medium that stores a TDM framing type corresponding to the physical interface. Finally, the provider edge node may include a circuit emulation engine that, during periods in which a network error has occurred, transmits a plurality of frames to the CE device over the physical interface. A TDM data payload of each frame may include an idle pattern, while a group of framing bits of the plurality of frames may define a framing pattern corresponding to the TDM framing type stored for the physical interface.

It should be apparent that, in this manner, various exemplary embodiments enable a provider edge node to improve the reliability of a TDM pseudowire connection. During periods in which a network error has occurred, the provider edge node may include an idle pattern in the frame payloads, while transmitting a framing pattern among a group of framing bits of the frames. In this manner, the provider edge node may maintain operation of the physical layer of the customer edge device, thereby reducing the time required to restore proper connectivity to the customer edge device.

BRIEF DESCRIPTION OF THE DRAWINGS

In order to facilitate better understanding of various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
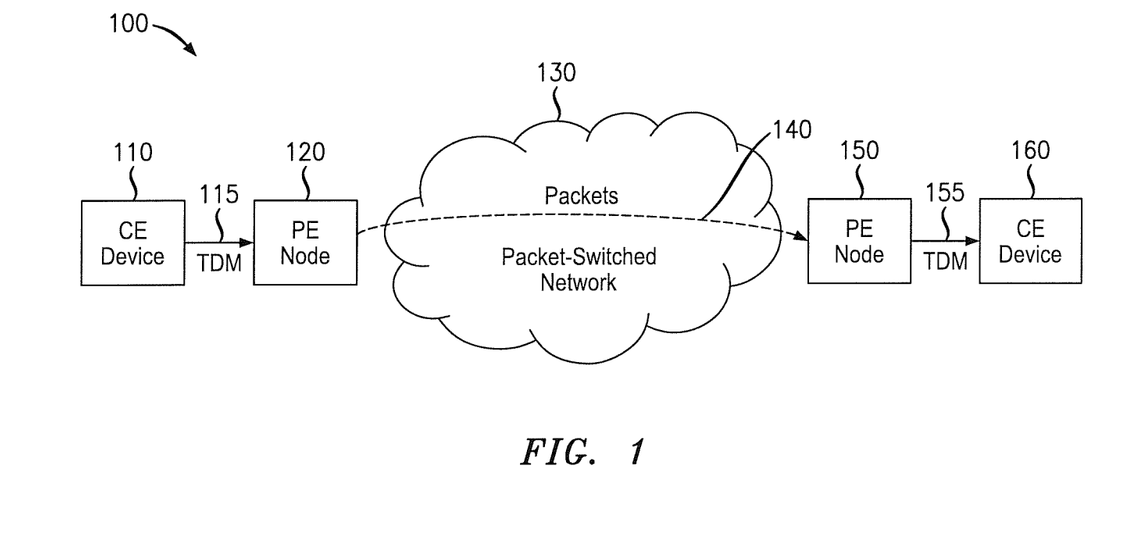
FIG. 1 is schematic diagram of an exemplary network for implementing emulation of TDM over a packet-switched network.

FIG. 1 is schematic diagram of an exemplary network 100 for implementing emulation of TDM over a packet-switched network. In various exemplary embodiments, network 100 includes a customer edge (CE) device 110, an attachment circuit 115, a provider edge (PE) node 120, a packet switched-network 130, a TDM pseudowire 140, a PE node 150, an attachment circuit 155, and a CE device 160.

CE device 110 may be equipment operated by a customer of a service provider. It should be apparent that although referred to as a "customer" edge device, CE device 110 may be owned and/or operated by the service provider. Accordingly, CE device 110 may be any device suitable for generating and sending TDM signals over attachment circuit 115.

Thus, CE device 110 may be a wireless base station including a wire line interface to forward TDM data streams into provider edge node 120. For example, CE device 110 may be a Node B in a 3G network or another base transceiver station communicating in a Global System for Mobile Communications (GSM) network, a Universal Mobile Telecommunications System (UMTS) network, a Long Term Evolution (LTE) network, or other wireless network. CE device 110 may also be a component for implementing a Plesiochronous Digital Hierarchy (PDH), a Synchronous Digital Hierarchy (SDH), or Synchronous Optical Networking (SONET). Other suitable components for implementation of CE device 110 will be apparent to those of skill in the art.

Attachment circuit 115 may transmit the TDM data stream from CE device 110 to PE node 120. As will be apparent to those of skill in the art, attachment circuit 115 may implement one of a number of carrier systems, including, but not limited to, T1, E1, T3, and E3.

PE node 120 may be configured to receive a TDM signal from CE device 110 over attachment circuit 115 and then convert the signal to a plurality of packets for transmission over packet-switched network 130. Thus, PE node 120 may be a network element such as a router, switch, or similar hardware device including functionality to enable communication over a TDM pseudowire 140. More specifically, PE node 120 may be configured to operate in accordance with SAToP, as described in RFC 4553, or a similar method. As described in further detail below, PE node 120 may convert the TDM frames into a plurality of packets, then transmit the packets across pseudowire 140 of packet-switched network 130.

Packet-switched network 130 may be any network operating in accordance with a packet-based protocol. Thus, network 130 may operate, for example, according to Transmission Control Protocol/Internet Protocol (TCP/IP), Multi Protocol Label Switching (MPLS), Asynchronous Transfer Mode (ATM), Frame Relay, Ethernet, Provider Backbone Transport (PBT), or any other suitable packet-based protocol that will be apparent to those of skill in the art.

Network 100 may also include a TDM pseudowire 140 for transmitting data between PE node 120 and PE node 150 over packet-switched network 130. More specifically, TDM pseudowire 140 may comprise one or more links in packet-switched network 130 for transmission of the plurality of packets outputted by PE node 120 that emulate a TDM signal. It should be apparent that, as used herein, the term "pseudowire" is not to be limited to IP/MPLS implementations. Rather, "pseudowire" should be understood to be applicable to any circuit emulation service that supports structure-agnostic transmission of data (e.g., Circuit Emulation Over Ethernet).

PE node 150 may be a network element such as a router, switch, or similar hardware device. PE node 150 may receive packets transmitted from PE node 120 over TDM pseudowire 140. PE node 150 may then convert the packets back into a TDM signal for transmission of the signal to CE device 160. More specifically, PE node 150 may receive the packets, determine the proper ordering based on a sequence number included in the packets, and output the corresponding TDM frames to CE device 160 over attachment circuit 155. As with attachment circuit 115, attachment circuit 155 may operate according to T1, E1, T3, E3, or any other suitable carrier system apparent to those of skill in the art.

CE device 160 may be any equipment suitable for receiving TDM signals over attachment circuit 155. For example, CE device 160 may be a component in a 3G, GSM, UMTS, LTE, or other wireless network. CE device 160 may also be a component for implementing PDH, SDH, or SONET. Other suitable components for implementation of CE device 160 will be apparent to those of skill in the art.

Having described the components of network 100, a brief summary of the operation of network 100 will be provided. It should be apparent that the following description is intended to provide an overview of the operation of network 100 and PE node 150 and is therefore a simplification in some respects. The detailed operation of PE node 150 will be described in further detail below in connection with FIGS. 2-5. During normal operation, CE device 110 generates a TDM signal including a number of frames, with each frame including data for a number of channels and, in some cases, a framing bit or bits used by CE device 160 to properly align the frames. By inserting a predefined pattern into framing bits of a group of sequential frames, CE device 110 may reliably indicate the start and end of each frame to CE device 160.

As will be apparent to those of skill in the art, the use of framing bits will vary depending on the framing type used by CE device 110 and CE device 160. For example, if CE device 110 uses T1 Superframes (T1-SF), each 193 bit frame will include an 8 bit data field for 24 channels and a single framing bit. Other suitable framing types include T1 Extended Superframes (T1-ESF), E1 Double Framing, E1 Multi-Framing, M13 Asynchronous Framing and C-Bit Parity framing for T3 systems, and G.751 and G.832 Framing for E3 systems. The implementation of framing patterns for these framing types will be apparent to those of skill in the art.

After generation of the TDM signal at CE device 110, PE node 120 may receive the signal from CE device 110 over attachment circuit 115. Upon receipt of the TDM bit stream, PE node 120 may divide the stream into a number of segments for encapsulation into packets. Because PE node 120 may be "structure-agnostic," PE node 120 may ignore the underlying framing structure of the TDM bit stream and simply treat the data as a series of sequential bits. Thus, when generating packets for transmission across packet-switched network 130, PE node 120 may include all framing bits in addition to the data payloads included in the incoming frames.

PE node 120 may then send the packets across TDM pseudowire 140 of packet-switched network 130 to PE node 150. Upon receipt of the packets, PE node 150 may extract the data payloads and generate frames for transmission to CE device 160 over attachment circuit 155. More specifically, as described in detail below in connection with FIG. 2, PE node 150 may temporarily store the payloads of the packets in a playout or jitter buffer, then output the payloads in TDM frames over attachment circuit 155 at a rate determined by an appropriate clock. In this manner, CE device 160 may receive a TDM signal corresponding to the original signal generated by CE device 110.

In some circumstances, an event may occur resulting in a temporary outage of service at one or more points in the network. In such situations, PE node 150 will be unable to transmit the original data corresponding to the TDM signal generated by CE device 110. For example, an error may occur at CE device 110 or over attachment circuit 115, such that PE node 120 no longer receives a TDM signal for transmission over pseudowire 140. Similarly, a fault or delay may occur at PE node 120 or in packet-switched network 130, such that PE node 150 does not receive the corresponding packets or that PE node 150 receives the packets with a delay, such that a buffer underrun results in the playout buffer of PE node 150. As another example, a switchover may occur, resulting in data transmission from a node other than CE device 110, thereby introducing a temporary delay. Other scenarios resulting in the inability of PE node 150 to output the data frames to CE device 160 will be apparent to those of skill in the art.

When such a fault occurs in current implementations of SAToP, PE node 150 outputs an unframed all "1"s pattern in both the payload and the framing bits of the TDM frames. Upon receiving this unframed all "1"s pattern, a typical response at CE device 160 is to bring down the physical layer (Layer 1) on the corresponding port. This response can be problematic when PE node 150 resumes sending of the correct data from CE device 110, as CE device 160 must restore all layers on the particular port, beginning with Layer 1. Such a restoration can require in the order of tens of seconds, which is unacceptable for high priority applications, such as voice traffic.

Various exemplary embodiments address this problem during network outages and delays by transmitting an idle pattern in the payload of the TDM frames outputted by PE node 150, but including a predefined framing pattern in the framing bits of the TDM frames. A network operator may predefine a framing type to be used for each physical interface upon failure or delay. Then, upon failure or delay for the particular physical interface, PE node 150 may generate frames including an idle pattern in the payload, but defining the framing pattern corresponding to the framing type in groups of sequential frames. This framing pattern may be generated using a single framing bit for each frame (e.g., for T1-SF and T1-ESF framing) or by setting multiple framing bits in each frame (e.g., for E1 framing).

In this manner, CE device 160 will receive a stream of frames including an idle pattern in the payload, but a recognizable framing pattern among the framing bits of the frames. CE device 160 will therefore be aware that PE node 150 has experienced problems in transmitting data from CE device 110, but the physical layer of CE device 160 will remain functional. Accordingly, upon restoration of service at PE node 150, CE device 160 may quickly resume operations in a time in the order of milliseconds, rather than seconds.

Figure 2:
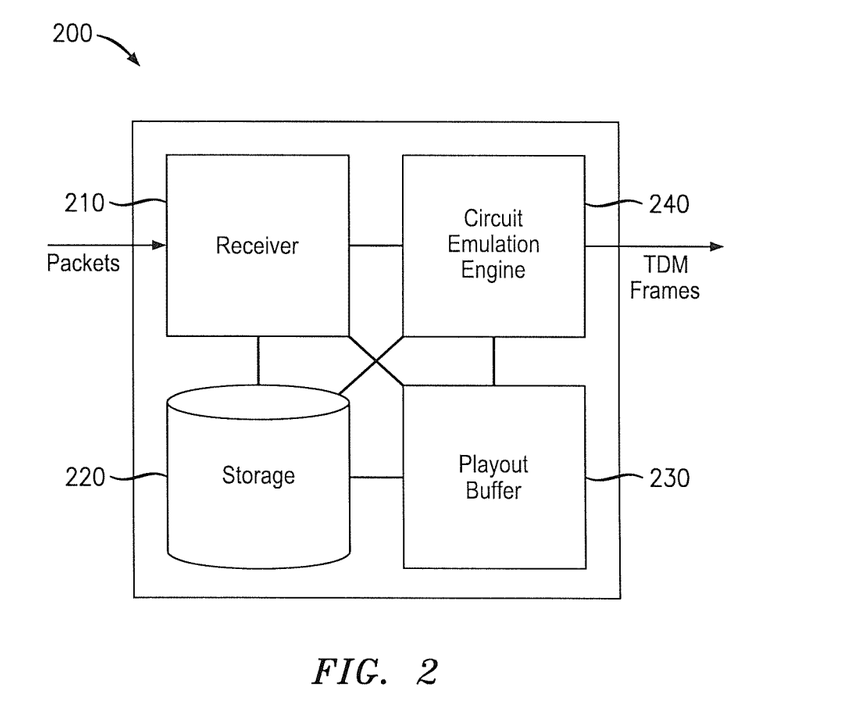
FIG. 2 is a schematic diagram of an exemplary node for use in the system of FIG. 1.

FIG. 2 is a schematic diagram of an exemplary node 200 for use in the network 100 of FIG. 1. Node 200 may operate as the last node in a packet-switched network, such that node 200 may receive a plurality of packets and transmit at least one TDM signal. Thus, node 200 may correspond, for example, to PE node 150 of network 100. In various exemplary embodiments, node 200 includes a receiver 210, storage 220, a playout buffer 230, and a circuit emulation engine 240.

Receiver 210 may be an interface comprising hardware and/or software encoded on a machine-readable storage medium configured to receive packets transmitted over a packet-switched network, such as network 130 of FIG. 1. More specifically, when serving as a receiver of packets transmitted over a pseudowire, such as pseudowire 140, receiver 210 may obtain a plurality of packets associated with a given TDM signal. These packets may include the TDM data payload and, in some cases, a framing bit or bits included in a particular framing pattern.

Storage 220 may be a machine-readable storage medium that maintains information regarding the TDM framing types to be used by one or more physical interfaces in node 200. The information included in storage 220 may be accessible to a network operator for modification, such that the network operator may specify the framing type to be used by each interface in the event of a failure. An exemplary data arrangement for use in storage 220 is described in further detail below in connection with FIG. 3.

Playout buffer 230 may be a component comprising hardware, such as a Field Programmable Gate Array (FPGA), and/or instructions encoded on a machine-readable storage medium configured to temporarily store packets prior to outputting the packets to circuit emulation engine 240. Thus, playout buffer 230 may comprise random access memory (RAM) or any other memory type, provided that playout buffer 230 may store packets from receiver 210 and output the packets to circuit emulation engine 240. Playout buffer 230 may compensate for packet delay variation in packets obtained at receiver 210. In particular, by buffering packets prior to outputting the packets to circuit emulation engine 240, playout buffer 230 may ensure that circuit emulation engine 240 has data to transmit and that circuit emulation engine 240 sends the TDM data associated with the packets at a constant rate.

Circuit emulation engine 240 may be a component comprising hardware and/or software encoded on a machine-readable storage medium. Circuit emulation engine 240 may further include a conventional microprocessor, an FPGA, or any other component configured to execute a series of instructions to implement the functionality detailed herein. More specifically, circuit emulation engine 240 may be configured to receive a plurality of packets from playout buffer 230, extract the data contained in the packets, then forward the data as TDM frames over an outgoing physical interface or port.

During periods of normal operation, circuit emulation engine 240 may generate frames including the payload of the packets, then transmit the frames to a customer edge device over a corresponding physical interface. In the event of a network delay or outage necessitating output of dummy data by node 200, circuit emulation engine 240 may first access storage 220 to determine the corresponding framing type for the particular physical interface. Circuit emulation engine 240 may then generate a plurality of frames, each frame including a payload consisting of an idle pattern (e.g., all "1"s). Furthermore, circuit emulation engine 240 may use a framing bit or bits in a group of these frames to define a framing pattern corresponding to the framing type retrieved from storage 220. Finally, circuit emulation engine 240 may output the generated frames to the CE device over the physical interface.

Figure 3:
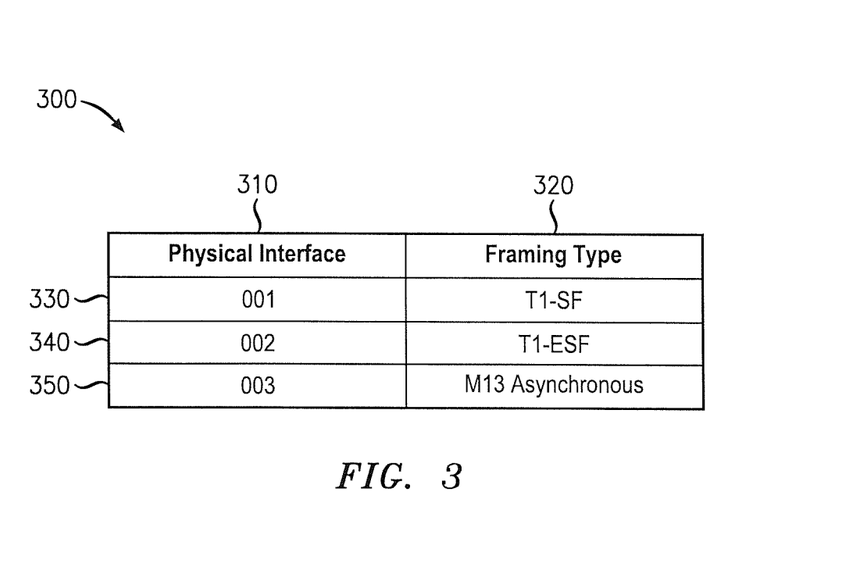
FIG. 3 is a table of an exemplary data arrangement used to maintain a correspondence between physical interfaces and framing types.

FIG. 3 is a table of an exemplary data arrangement 300 used to maintain a mapping between physical interfaces in node 200 and a corresponding framing type to be used for outputted frames. Data arrangement 300 may be stored in storage 220 and may be, for example, a table. Alternatively, data arrangement 300 could be a series of linked lists, a binary tree, an array, or a similar data structure. Thus, it should be apparent that data arrangement 300 is an abstraction of the underlying data; any data structure suitable for storage of this data may be used.

Data arrangement 300 may include two sets of data: a physical interface field 310 and a framing type field 320. Physical interface field 310 may identify a particular port in node 200 used to output TDM frames to a corresponding CE device.

Framing type field 320 may identify a framing type used for frames outputted from node 200 during periods in which node 200 is experiencing delay or outages and must therefore output dummy data to the CE device. For example, when the carrier system used for communication between node 200 and the corresponding CE device is T1, the TDM framing type may be T1 Superframing (T1-SF) or T1 Extended Superframing (T1-ESF). When the carrier system is E1, the TDM framing type may be E1 Double Framing or E1 Multi-Framing. Similarly, when the carrier system is E3, the TDM framing type may be M13 Asynchronous Framing or C-Bit Parity Framing. Finally, when the carrier system is E3, the TDM framing type may be G.751 Framing or G.832 Framing. Other suitable framing types will be apparent to those of skill in the art.

As an example, suppose that data arrangement 300 is maintained in storage 220 of PE node 150. Entry 330 indicates that PE node 150 uses T1-SF framing for port 001. Entry 340 indicates that PE node 150 uses T1-ESF framing for port 002. Finally, entry 350 indicates that PE node 150 uses M13 Asynchronous framing for port 003.

Figure 4A:
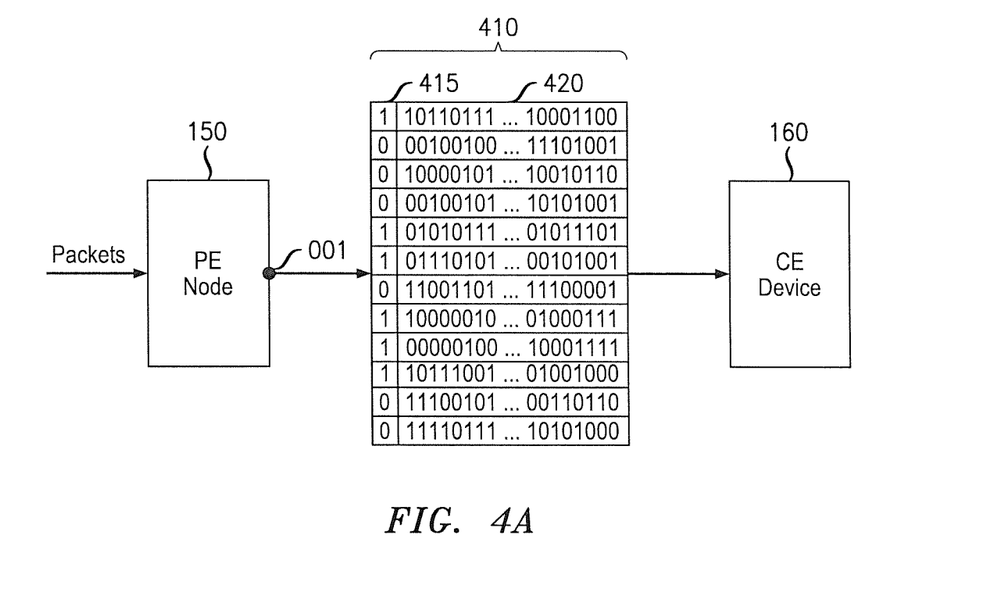
FIG. 4A is a schematic diagram of a transmission of frames from a provider edge node to a customer edge device during a period of normal operation.

FIG. 4A is a schematic diagram of a transmission of frames from a provider edge node 150 to a customer edge device 160 during a period of normal operation. As illustrated, PE node 150 receives packets and outputs a plurality of frames 410 to CE device 160 over port 001. Each of the frames 410 includes a framing bit 415 and a payload 420. Because PE node 150 may operate according to a structure agnostic method, such as SAToP, PE node 150 is unaware of the underlying framing bits. In other words, PE node 150 sequentially encodes the bits included in the incoming data packets into frames.

Thus, PE node 150 first transmits a frame including "1" in the framing bit, with "10110111 . . . 10001100" in the payload, the payload including a total of 24 bytes. The framing bits 415 of the subsequent frames transmitted from PE node 150 to CE device 160 form the T1-SF framing pattern, "100011011100," such that CE device 160 may reliably determine the start and end of each frame. It should be apparent that, although the framing pattern is included in the frames transmitted from PE node 150 to CE device 160, PE node 150 need not be aware of the framing type. Rather, because the system is structure-agnostic, the framing pattern is included in the data packets transmitted to PE node 150 and included in the frames outputted to CE device 160.

Figure 4B:
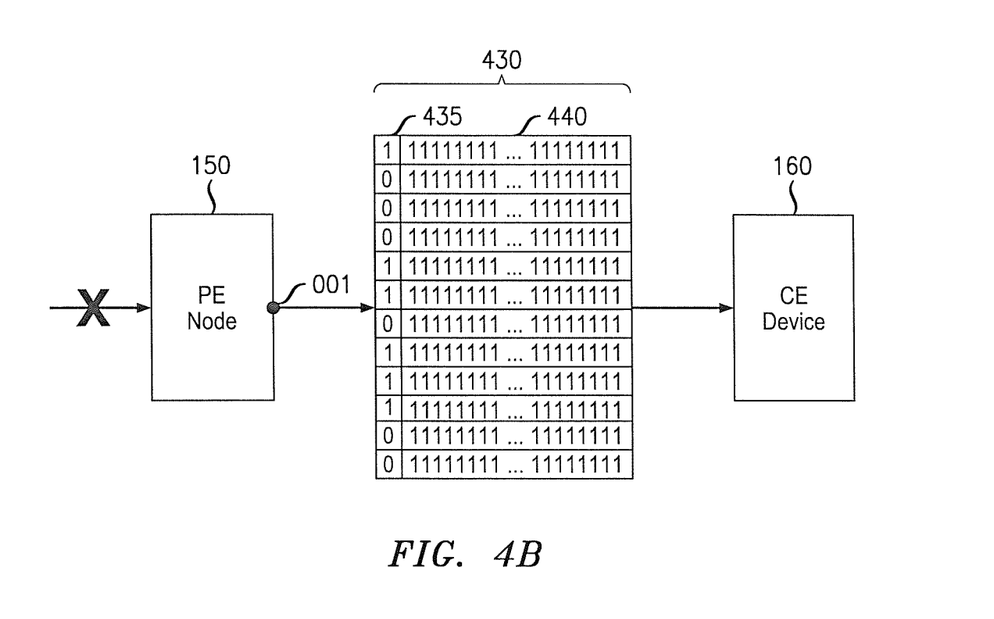
FIG. 4B is a schematic diagram of a transmission of frames from a provider edge node to a customer edge device during a period in which a network error has occurred.

FIG. 4B is a schematic diagram of a transmission of frames from a provider edge node 150 to a customer edge device 160 during a period in which a network error has occurred. As illustrated, the flow of data packets into PE node 150 has been interrupted, such that PE node 150 must transmit dummy frames to CE device 160.

Rather than simply transmitting a stream of all "1"s, PE node 150 may respond to the network error in a manner designed to maintain the physical layer of CE device 160 in an operational state. More specifically, PE node 150 may first determine the TDM framing type for the affected port, 001. In this case, by accessing data arrangement 300, PE node 150 may determine that port 001 uses T1-SF framing. PE node 150 may then begin generating frames 430 for transmission to CE device 160, including an idle pattern (e.g., all "1"s) in the payloads 440, while generating the T1-SF framing pattern ("100011011100") among the framing bits 435 of the twelve sequential frames 430.

It should be apparent that the framing pattern for T1-SF is predefined for the framing type and will therefore be known to those of skill in the art. As another example, if the framing type is T1-ESF, the size of the superframe is extended to 24 frames, with the bits of frames 4, 8, 12, 16, 20, and 24 defining a framing pattern of "001011." Bits 2, 6, 10, 14, 18, and 22 define a value used for a Cyclic Redundancy Check (CRC), which verifies the validity of the transmitted data. Thus, in this case, PE node 150 may set the CRC bits to a value calculated for the idle pattern. The additional 12 unused bits may be used for maintenance of the link. For example, these bits may be used to indicate alarm signals, implement loopback functionality, and perform related functions. PE node 150 may also set these bits to predefined values (e.g., all "1"s or all "0"s). Framing patterns suitable for use with additional framing types will be apparent to those of skill in the art.

Figure 5:
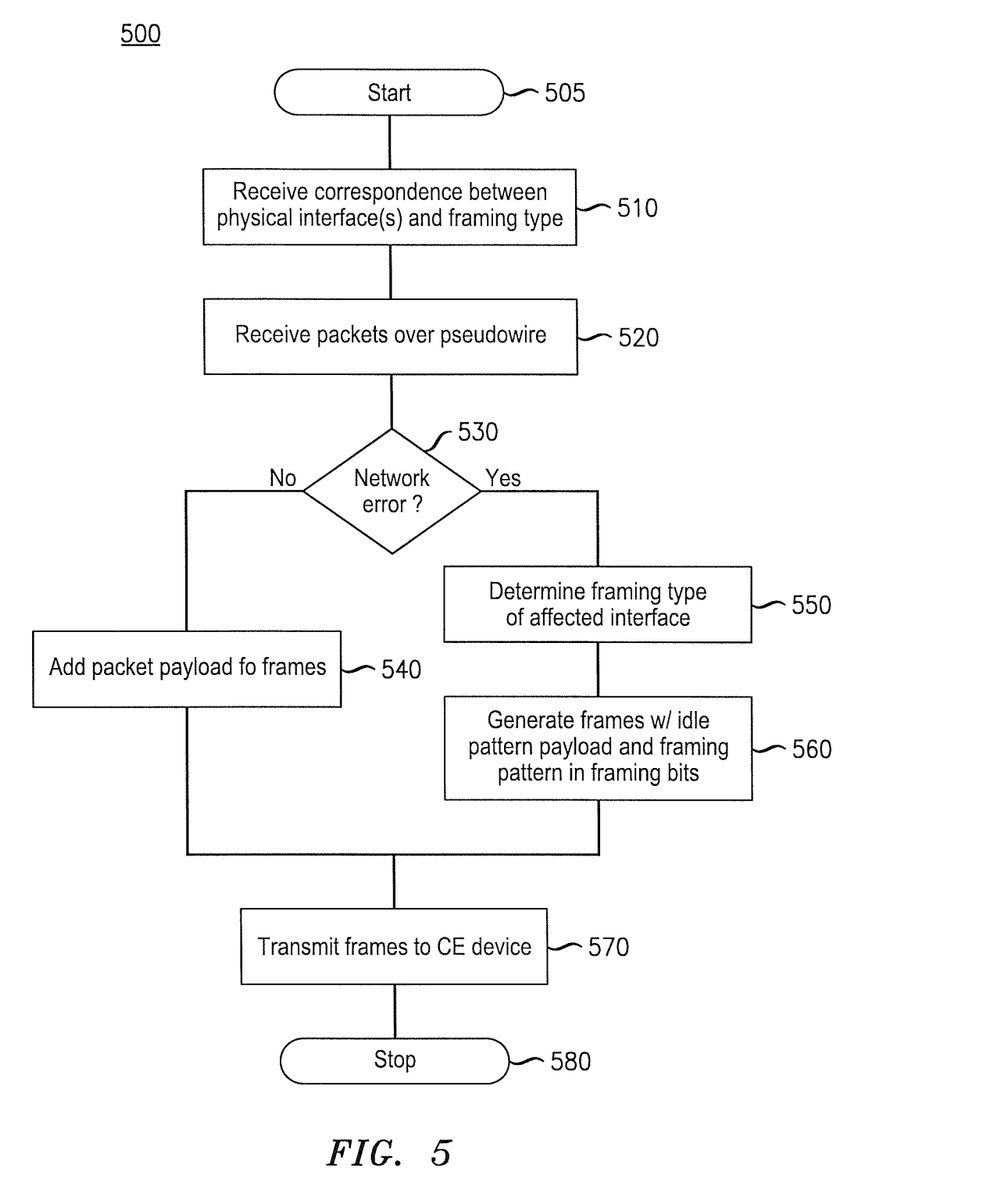
FIG. 5 is a flowchart of an exemplary embodiment of a method of maintaining a Time-Division Multiplexing (TDM) connection over a TDM pseudowire.

FIG. 5 is a flowchart of an exemplary embodiment of a method 500 of maintaining a Time-Division Multiplexing (TDM) connection over a TDM pseudowire. Method 500 may be performed by, for example, PE node 150 of network 100. Although the steps shown in FIG. 5 are described as performed by PE node 150, other suitable components or systems for execution of method 500 will be apparent to those of skill in the art.

Method 500 starts in step 505 and proceeds to step 510, where a network operator may predefine a framing type for each physical interface of PE node 150. As will be apparent to those of skill in the art, each framing type may be associated with a predefined framing pattern formed by a group of framing bits of sequential frames.

Method 500 then proceeds to step 520, where PE node 150 begins receiving packets from PE node 120 over TDM pseudowire 140. Method 500 then proceeds to decision step 530, where PE node 150 determines whether a network error has occurred that necessitates transmission of dummy data from PE node 150 to CE device 160.

When, in decision step 530, PE node 150 determines that a network error has not occurred, method 500 proceeds to step 540, where PE node 150 may add the payload of one or more packets to one or more frames for transmission to CE device 160. In particular, PE node 150 may insert the raw data included in the packet payload fields into TDM frames. Method 500 then proceeds to step 570, described in detail below.

On the other hand, when, in decision step 530, PE node 150 determines that a network error has occurred, method 500 proceeds to step 550. In step 550, PE node 150 may determine the framing type to be used for transmission of dummy frames for the affected interface. As described in detail above, PE node 150 may make this determination by accessing data arrangement 300 stored in storage 220.

Method 500 then proceeds to step 560, where PE node 150 generates frames including an idle pattern in the payload. PE node 150 may set the framing bit or bits of each frame of a group of these frames to form the framing pattern corresponding to the framing type used for the physical interface. Method 500 then proceeds to step 570.

In step 570, PE node 150 transmits the generated frames to CE device 160. In this manner, during periods of normal operation, PE node 150 transmits frames corresponding to the data payload of the packet received over TDM pseudowire 140. During periods in which a network error has occurred, PE node 150 transmits a number of frames including an idle pattern and defining a framing pattern corresponding to a predefined framing type. Accordingly, the physical layer of CE device 160 remains operational, thereby minimizing delays in restoration of service to CE device 160 when a network error occurs.

Method 500 then proceeds to step 580, where method 500 stops. It should be apparent that method 500 is shown as a single iteration of the processing performed by PE node 150. Thus, rather than stopping in step 580 after sending the frames, method 500 may return to step 520, where PE node 150 receives additional packets and repeats the processing.

According to the foregoing, various exemplary embodiments enable a provider edge node to maintain a TDM over pseudowire connection during a network outage or delay. In particular, during periods in which a network outage or delay has occurred, a provider edge node may transmit a framing pattern among the framing bits of the frames, while transmitting an idle pattern in the frame payloads. In this manner, the provider edge node may maintain operation of the physical layer of the customer edge device, greatly minimizing the time required to restore proper connectivity when a network error occurs.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g., router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

We claim:

1. A network node configured for use in a packet-switched network including a Time-Division Multiplexing (TDM) pseudowire, the network node comprising:
 a receiver configured to receive at least one packet transmitted over the TDM pseudowire using a structure-agnostic transmission mechanism, wherein a data payload of the at least one packet comprises a framing bit and a TDM data payload;
 a physical interface configured to output frames to a corresponding customer edge (CE) device;
 a non-transitory storage medium configured to store a TDM framing type corresponding to the physical interface; and
 a circuit emulation processor that during periods of normal operation, is configured to transmit frames corresponding to the data payload of the at least one packet to the CE device over the physical interface, and, during periods in which a network error has occurred, is configured to transmit a plurality of frames, wherein each frame includes a framing bit, to the CE device over the physical interface, wherein a TDM data payload of each frame includes an idle pattern, a group of framing bits of the plurality of frames defines a framing pattern corresponding to the TDM framing type stored for the physical interface,
 and a predefined framing type is used for the physical interface when the network error has occurred.

2. The network node of claim 1, wherein the structure-agnostic transmission mechanism is implemented according to Structure-Agnostic Time Division Multiplexing over Packet (SAToP).

3. The network node of claim 1, wherein the idle pattern consists of a plurality of bits set to the value "1."

4. The network node of claim 1, wherein a network operator predefines the TDM framing type corresponding to the physical interface based on knowledge of a carrier system used by the CE device.

5. The network node of claim 4, wherein the carrier system is selected from a group consisting of T1, E1, T3, and E3.

6. The network node of claim 4, wherein the carrier system is T1 and the TDM framing type is selected from a group consisting of T1 Superframes (T1-SF) and T1 Extended Superframes (T1-ESF).

7. The network node of claim 4, wherein the carrier system is E1 and the TDM framing type is selected from a group consisting of E1 Double Framing and E1 Multi-Framing.

8. The network node of claim 4, wherein the carrier system is T3 and the TDM framing type is selected from a group consisting of M13 Asynchronous Framing and C-Bit Parity Framing.

9. The network node of claim 4, wherein the carrier system is E3 and the TDM framing type is selected from a group consisting of G.751 Framing and G.832 Framing.

10. The network node of claim 1, wherein the network error is caused by at least one of a failure of an attachment circuit to which a TDM transmitter is coupled, a switchover from the TDM transmitter to a new TDM transmitter, a loss of one or more packets transmitted over the TDM pseudowire, and a buffer underrun in a playout buffer of the network node.

11. A method of maintaining a Time-Division Multiplexing (TDM) connection over a TDM pseudowire, the method comprising:
 storing, in a network node, a correspondence between a physical interface of the network node and a TDM framing type used for frames outputted to a customer edge (CE) device over the physical interface;
 receiving, in the network node, at least one packet transmitted over the TDM pseudowire using a structure-agnostic transmission mechanism, wherein a data payload of the at least one packet comprises a framing bit and a TDM data payload;
 predefining a framing type to be used for the physical interface when a network error has occurred;
 during periods of normal operation, transmitting frames corresponding to the data payload of the at least one packet to the CE device over the physical interface; and
 during periods in which the network error has occurred, transmitting a plurality of frames, wherein each frame includes a framing bit, according to the predefined framing type to the CE device over the physical interface, wherein a TDM data payload of each frame includes an idle pattern, and a group of framing bits of the plurality of frames defines a framing pattern corresponding to the TDM framing type stored for the physical interface.

12. The method of claim 11, further comprising:
implementing the structure-agnostic transmission mechanism according to Structure-Agnostic Time Division Multiplexing over Packet (SAToP).

13. The method of claim 11, wherein the idle pattern consists of a plurality of bits set to the value "1."

14. The method of claim 11, further comprising:
predefining the TDM framing type corresponding to the physical interface based on knowledge of a carrier system used by the CE device.

15. The method of claim 14, further comprising:
selecting the carrier system from a group consisting of T1, E1, T3, and E3.

16. The method of claim 14, wherein the carrier system is T1 and further comprising:
selecting the TDM framing type from a group consisting of T1 Superframes (T1-SF) and T1 Extended Superframes (T1-ESF).

17. The method of claim 14, wherein the carrier system is E1 and further comprising:
selecting the TDM framing type from the group consisting of E1 Double Framing and E1 Multi-Framing.

18. The method of claim 14, wherein the carrier system is T3 and further comprising:
selecting the TDM framing type from a group consisting of M13 Asynchronous Framing and C-Bit Parity Framing.

19. The method of claim 14, wherein the carrier system is E3 and further comprising:
selecting the TDM framing type from a group consisting of G.751 Framing and G.832 Framing.

20. The method of claim 11, wherein the network error is caused by at least one of a failure of an attachment circuit to which a TDM transmitter is coupled, a switchover from the TDM transmitter to a new TDM transmitter, a loss of one or more packets transmitted over the TDM pseudowire, and a buffer underrun in a playout buffer of the network node.

* * * * *